(12) United States Patent
Song et al.

(10) Patent No.: US 11,732,735 B2
(45) Date of Patent: Aug. 22, 2023

(54) SOFT ACTUATOR WITH VARIABLE-STIFFNESS HINGE

(71) Applicant: Toyota Motor Engineering & Manufacturing North America, Inc., Plano, TX (US)

(72) Inventors: Yuyang Song, Ann Arbor, MI (US); Ryohei Tsuruta, Ann Arbor, MI (US); Umesh N. Gandhi, Farmington Hills, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/479,079

(22) Filed: Sep. 20, 2021

(65) Prior Publication Data

US 2023/0088911 A1   Mar. 23, 2023

(51) Int. Cl.
*F15B 15/08*   (2006.01)
*B25J 9/14*   (2006.01)
*B25J 9/10*   (2006.01)

(52) U.S. Cl.
CPC ............ *F15B 15/08* (2013.01); *B25J 9/142* (2013.01); *B25J 9/1005* (2013.01)

(58) Field of Classification Search
CPC ....................................................... B25J 9/142
See application file for complete search history.

(56) References Cited

U.S. PATENT DOCUMENTS

| | | | |
|---|---|---|---|
| 4,944,755 A * | 7/1990 | Hennequin et al. | A61F 2/604 623/18.11 |
| 9,664,210 B2 | 5/2017 | Ou et al. | |
| 9,719,534 B2 * | 8/2017 | Shevchenko et al. | F15B 15/103 |
| 9,764,220 B2 | 9/2017 | Keating et al. | |
| 2014/0314976 A1 * | 10/2014 | Niiyama et al. | G06F 3/0488 428/34.3 |

FOREIGN PATENT DOCUMENTS

| | | | |
|---|---|---|---|
| DE | 20309196 U1 * | 11/2003 | ............... B25J 9/142 |
| DE | 10222022 A1 * | 12/2003 | ............... B25J 9/142 |
| EP | 1519055 A2 * | 3/2005 | ............ F15B 15/103 |
| JP | 2006000347 A * | 1/2006 | |

OTHER PUBLICATIONS

English machine translation of DE10222022 A1 to Schulz (Year: 2022).*
Ou, J. et al., "aeroMorph - Heat-sealing Inflatable Shape-change Materials for Interaction Design," Proceedings of the 29th Annual Symposium on User Interface Software and Technology (2016) pp. 121-132 (10 pages).
Ou, J. et al., "jamSheets: Thin Interfaces with Tunable Stiffness Enabled by Layer Jamming," Proceedings of the 8th International Conference on Tangible, Embedded, and Embodied Interaction (2014) 8 pages.

* cited by examiner

*Primary Examiner* — Thomas E Lazo
(74) *Attorney, Agent, or Firm* — Christopher G. Darrow; Darrow Mustafa PC

(57) ABSTRACT

A soft actuator includes an inflation chamber. The inflation chamber has a first end and a second end opposite the first end. The inflation chamber is inflatable during an inflation stage, in which the second end rotates toward the first end about a folding axis, and is operable to be loaded during an inflated stage, in which the inflation chamber is inflated. The soft actuator also includes a variable-stiffness hinge located between the first end and the second end along the folding axis. The variable-stiffness hinge has a decreased stiffness in the inflation stage and an increased stiffness in the inflated stage.

20 Claims, 6 Drawing Sheets

SOFT ACTUATOR WITH VARIABLE-STIFFNESS HINGE

TECHNICAL FIELD

The embodiments disclosed herein relate to a soft actuator and, more particularly, to a soft actuator with a variable-stiffness hinge.

BACKGROUND

Actuators have a variety of applications, including robotics, manufacturing, and transportation. In robotic applications, soft actuators may be used, and may be actuated by mechanical, thermal, and/or electrical stimuli.

SUMMARY

Disclosed herein are embodiments of a soft actuator and an actuation system including the soft actuator.

In one aspect, a soft actuator includes an inflation chamber. The inflation chamber has a first end and a second end opposite the first end. The inflation chamber is inflatable during an inflation stage, in which the second end rotates toward the first end about a folding axis, and is operable to be loaded during an inflated stage, in which the inflation chamber is inflated. The soft actuator also includes a variable-stiffness hinge located between the first end and the second end along the folding axis. The variable-stiffness hinge has a decreased stiffness in the inflation stage and an increased stiffness in the inflated stage.

In another aspect, a soft actuator includes an inflation chamber. The inflation chamber has a first end and a second end opposite the first end. The inflation chamber is inflatable during an inflation stage, in which the second end rotates toward the first end about a folding axis, and is operable to be loaded during an inflated stage, in which the inflation chamber is substantially fully inflated. The soft actuator also includes a variable-stiffness hinge located between the first end and the second end along the folding axis. The variable-stiffness hinge has a decreased stiffness in the inflation stage and an increased stiffness in the inflated stage. The soft actuator also includes two jamming surfaces located at the hinge. In the inflation stage, the jamming surfaces are slidable across each other to decrease the stiffness of the hinge. In the inflated stage, the jamming surfaces are pressed together to increase the stiffness of the hinge.

In yet another aspect, an actuation system includes a soft actuator. The soft actuator includes an inflation chamber. The inflation chamber has a first end and a second end opposite the first end. The inflation chamber is inflatable during an inflation stage, in which the second end rotates toward the first end about a folding axis, and is operable to be loaded during an inflated stage, in which the inflation chamber is inflated. The soft actuator also includes a variable-stiffness hinge located between the first end and the second end along the folding axis. The variable-stiffness hinge has a decreased stiffness in the inflation stage and an increased stiffness in the inflated stage. The actuation system also includes a computing device configured to identify a condition of the soft actuator and cause the stiffness of the hinge to be increased or decreased based on the condition.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a soft actuator having a variable-stiffness hinge, an actuation system including the soft actuator, and a method for the actuation system.

Figure 1:
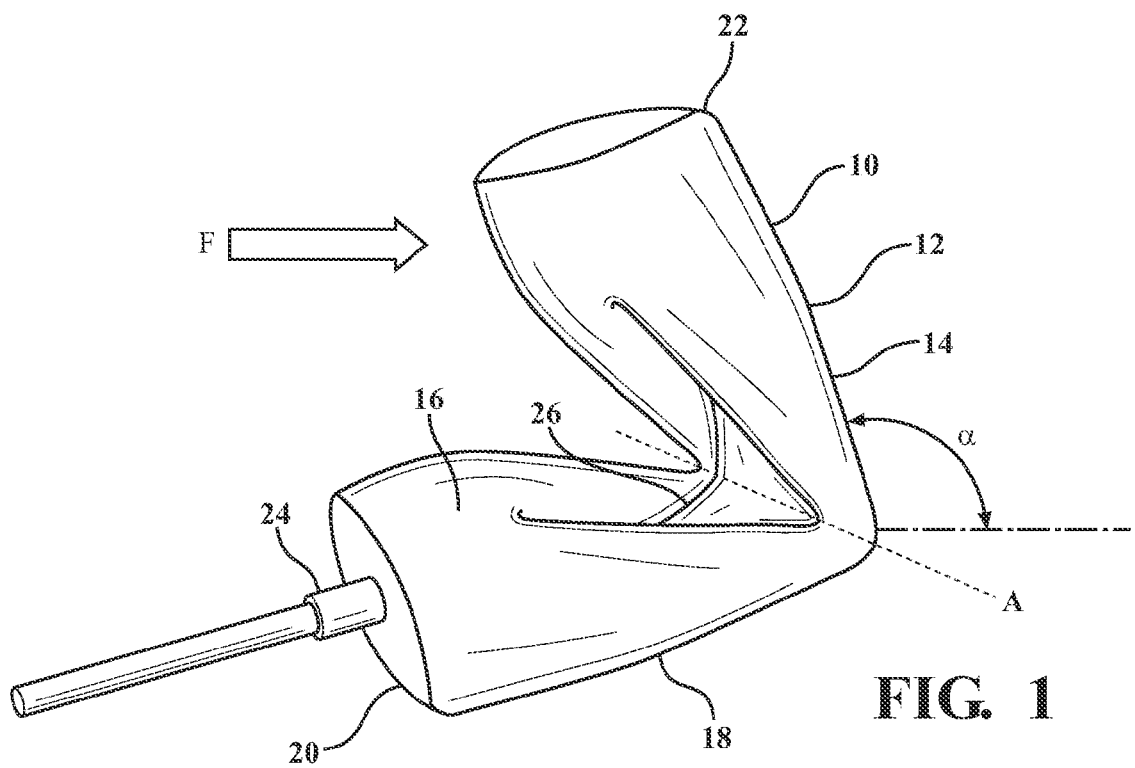
FIG. 1 is an example of a soft actuator with a variable-stiffness hinge.

Referring to FIG. 1, an example of a soft actuator 10 is shown. The soft actuator 10 has an inflation chamber 12, an outer perimeter 14, a first side 16, a second side 18 opposite the first side 16, a first end 20 (e.g. a fixed end), and a second end 22 (e.g. a moving end) opposite the first end 20. The inflation chamber 12 can be a pouch-like inflation chamber 12 and can be made from any suitable soft, flexible, and inflatable material. For example, the inflation chamber 12 can be made from fabric or plastic. The inflation chamber 12 can have any suitable shape. As shown, the inflation chamber 12 has a substantially rectangular shape. However, the inflation chamber 12 can have a circular, diamond, or any other suitable shape.

The first side 16 and the second side 18 of the soft actuator 10 can also belong to the inflation chamber 12. The first side 16 and the second side 18 of the inflation chamber 12 can be two separate pieces of material that are sealed or seamed together along the outer perimeter 14. Alternatively, the first side 16 and the second side 18 of the inflation chamber 12 can be formed from the same piece of material that is folded over itself and sealed or seamed along the outer perimeter 14.

Figure 5:
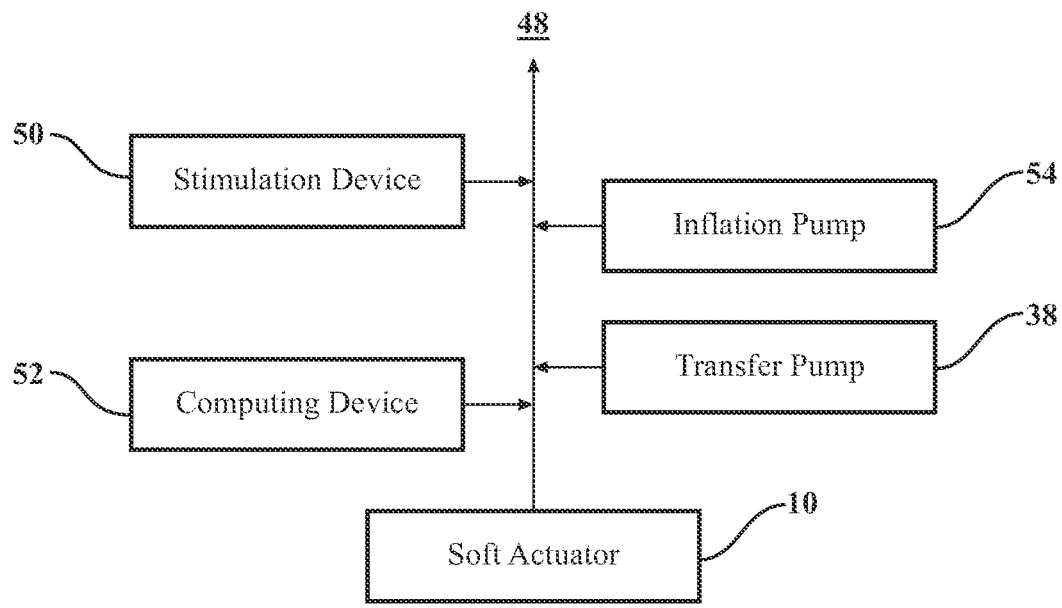
FIG. 5 is an example of an actuation system including the soft actuator.

The inflation chamber 12 is configured to be inflated and deflated. The inflation chamber 12 can be inflated with any suitable fluid, including air or liquid. Accordingly, the soft actuator 10 includes an inflation port 24. The inflation port 24 is fluidly connected to the inflation chamber 12 and is connectable to an inflation pump (FIG. 5). The inflation pump is configured to pump fluid into the inflation chamber 12 through the inflation port 24 to inflate the inflation chamber 12. The inflation pump is also configured to pump fluid out of the inflation chamber 12 through the inflation port 24 to deflate the inflation chamber 12.

As the soft actuator 10 is inflated, it is configured to bend in a folding manner. Accordingly, the soft actuator 10 has a folding axis A. The folding axis A can be substantially between the first end 20 and the second end 22 in the center of the soft actuator 10. Located along the folding axis A, the soft actuator 10 has a hinge 26. The hinge 26 is flexible and allows the soft actuator 10 to fold along the folding axis A. As the soft actuator 10 folds, the second end 22 (e.g. the moving end) moves toward first end 20 (e.g. the fixed end) about the folding axis A. For example, the second end 22 rotates toward the first end 20 about the folding axis A. Moreover, the soft actuator 10 has a bending angle α which may increase as the soft actuator 10 folds. The bending angle α can be measured from a fixed surface or plane to the second end 22. The bending angle α can vary from substantially 0° to about or over 90°.

Figure 2A:
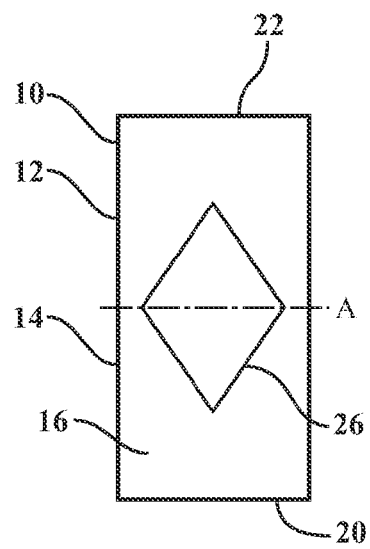
FIG. 2A is an example of a diamond-shaped variable-stiffness hinge.
Figure 2B:
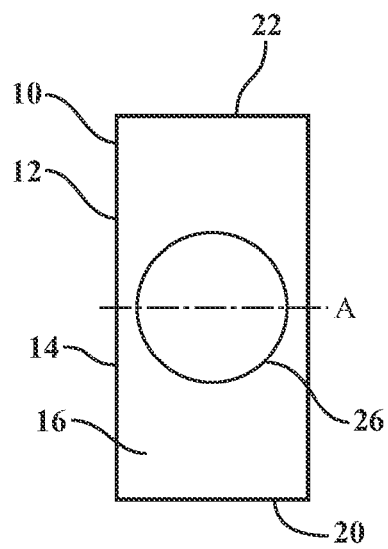
FIG. 2B is an example of a circle-shaped variable-stiffness hinge.
Figure 2C:
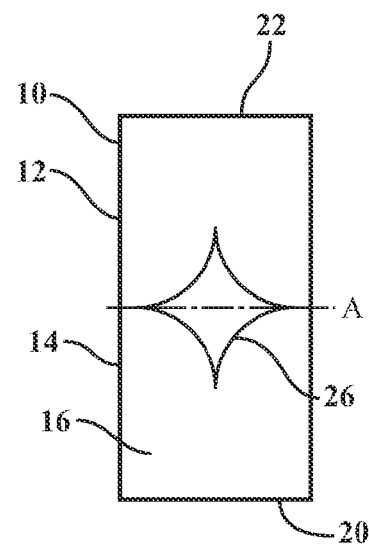
FIG. 2C is an example of a star-shaped variable-stiffness hinge.

With additional reference to FIGS. 2A-2C, the hinge 26 can have any suitable shape. For example, the hinge 26 can have a circle shape (FIG. 2A), a star shape (FIG. 2B), or a diamond shape (FIG. 2C). Moreover, the hinge 26 can be formed in any suitable manner. For example, the hinge 26 can be formed by sealing or seaming the first side 16 and the second side 18 together at the hinge 26, by integrating additional material into the first side 16 and the second side 18 at the hinge 26, and/or by adding material between the first side 16 and the second side 18 at the hinge 26.

Figure 3A:
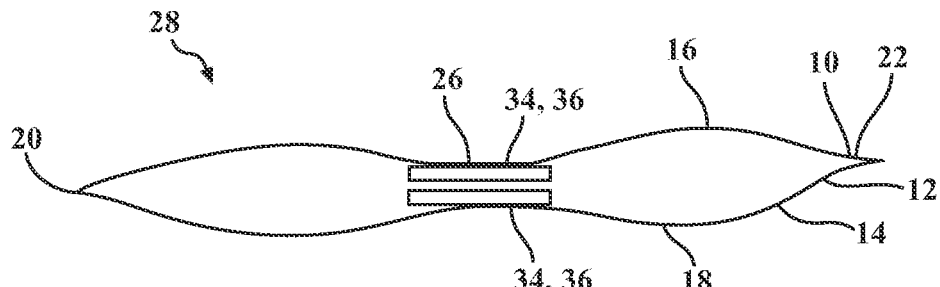
FIG. 3A is a cross-section of a first and second implementation of the soft actuator in a deflated stage.
Figure 3B:
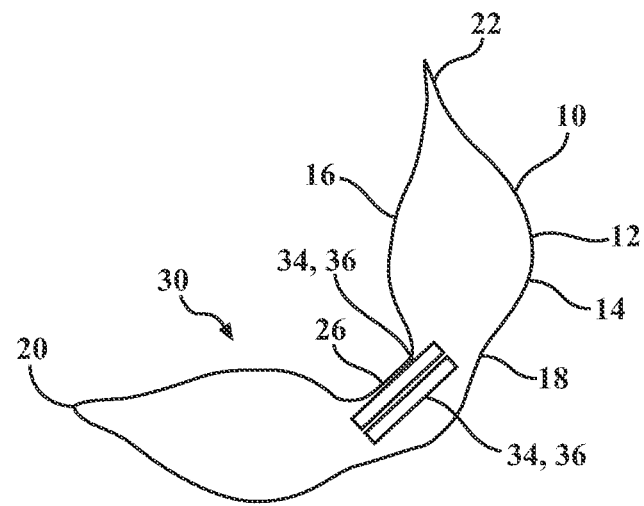
FIG. 3B is a cross-section of the first and second implementation of the soft actuator in an inflation stage.
Figure 3C:
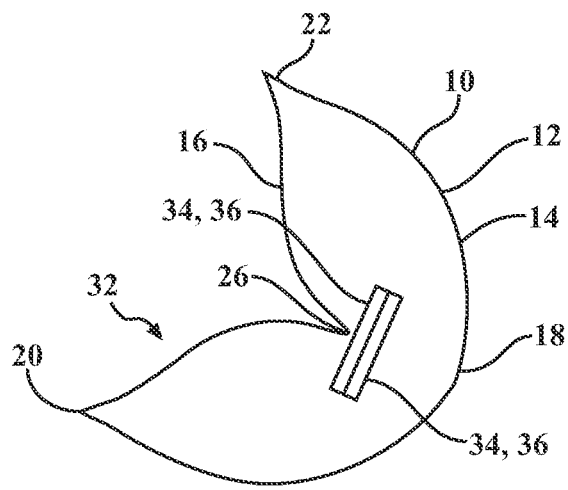
FIG. 3C is a cross-section of the first and second implementation of the soft actuator in an inflated stage.

Referring to FIGS. 3A-3C, the soft actuator 10 can be operated in three stages. As shown in FIG. 3A, the first stage is a deflated stage 28. In the deflated stage 28, the soft actuator 10 is not inflated (e.g., not substantially inflated) and the bending angle α is substantially 0°. As shown in FIG. 3B, the second stage is an inflation stage 30. In the inflation stage 30, the soft actuator 10 is undergoing inflation (e.g., the inflation pump is pumping fluid into the inflation chamber 12 through the inflation port 24) and the second end 22 rotates toward the first end 20 about the hinge 26 (folding axis A). In the inflation stage 30, the bending angle α is increasing. As shown in FIG. 3C, the third stage is an inflated stage 32. In the inflated stage 32, the soft actuator 10 is substantially fully inflated and the bending angle α is about or over 90°.

Among other characteristics of the soft actuator 10, the inflation chamber 12 has a deformability. The deformability can be a measurement of how much the inflation chamber 12 deforms when subjected to a load F (e.g. force) (FIG. 1). The deformability can vary across the three stages. For example, the inflation chamber 12 can have a relatively high deformability in the inflation stage 30, and a higher deformability in the deflated stage 28. The relatively high deformability of the deflated stage 28 and the inflation stage 30 allows the soft actuator 10 to undergo inflation and change shape as needed. In the inflated stage 32, the inflation chamber 12 can have a relatively lower deformability, which allows the soft actuator 10 to withstand a relatively high amount of loading. In other words, the deformability of the inflation chamber 12 can decrease from the deflated stage 28 to the inflated stage 32 as the pressure within the inflation chamber 12 increases.

In conjunction with the deformability of the soft actuator 10, the operation of the soft actuator 10 may be varied by changing the stiffness of the hinge 26. Accordingly, the hinge 26 can be a variable-stiffness hinge 26. The stiffness of the hinge 26 can be varied across the three stages. In the deflated stage 28 and the inflation stage 30, the hinge 26 can have a decreased stiffness (e.g., the hinge 26 can be soft and/or flexible). The decreased stiffness of the hinge 26 allows the soft actuator 10 to undergo inflation and change shape as needed. In the inflated stage 32, the hinge 26 has an increased stiffness (e.g., the hinge 26 can be stiff and/or rigid). The increased stiffness of the hinge 26 allows the soft actuator 10 to withstand a relatively high amount of loading without bending substantially about the folding axis. The hinge 26 can be configured to have a variable stiffness in any suitable manner.

With reference again to FIGS. 3A-3C, in one implementation, the hinge 26 can include active material 34. As shown, the active material 34 can be located between the first side 16 and the second side 18 and can be connected to the inside of the first side 16 and the inside of the second side 18. In another example, a portion of the first side 16 and the second side 18 can be made from active material 34. The active material 34 can be any active material 34 configured to change stiffness when activated (e.g., when electrical energy is applied to the active material 34) and/or deactivated (e.g., when no electrical energy is applied to the active material 34). For example, the active material 34 can be shape memory alloy (SMA) or shape memory polymer (SMP). In some examples, the active material 34 can have an increased stiffness when activated and a decreased stiffness when deactivated. In the deflated stage 28 and the inflation stage 30, as shown in FIGS. 3A and 3B, the active material 34 can be deactivated to decrease the stiffness of the hinge 26. In the inflated stage 32, as shown in FIG. 3C, the active material 34 can be activated to increase the stiffness of the hinge 26.

In a second implementation, the hinge 26 can include two opposed jamming surfaces 36. As shown, the jamming surfaces 36 can be located between the first side 16 and the second side 18 and connected to the inside of the first side 16 and the inside of the second side 18, respectively. In another example, the jamming surfaces 36 can be part of the inside of the first side 16 and the inside of the second side 18. In order to increase the stiffness of the hinge 26, the jamming surfaces 36 can be pressed together to increase the friction between them, such that the first side 16 and the second side 18 are pressable together at the hinge 26 and are not able to move with respect to each other. Accordingly, the jamming surfaces 36 can be made of any suitable high-friction material. For example, the jamming surfaces 36 can be jamming sheets made of sandpaper. In order to decrease the stiffness of the hinge 26, the jamming surfaces 36 are not pressed together (e.g., they are separated from each other or are touching each other but are slidable across each other). In the deflated stage 28 and the inflation stage 30, the hinge 26 is configured such that the jamming surfaces 36 are not pressed together. In the inflated stage 32, the hinge 26 is configured such that the jamming surfaces 36 are pressed together.

Figure 3D:
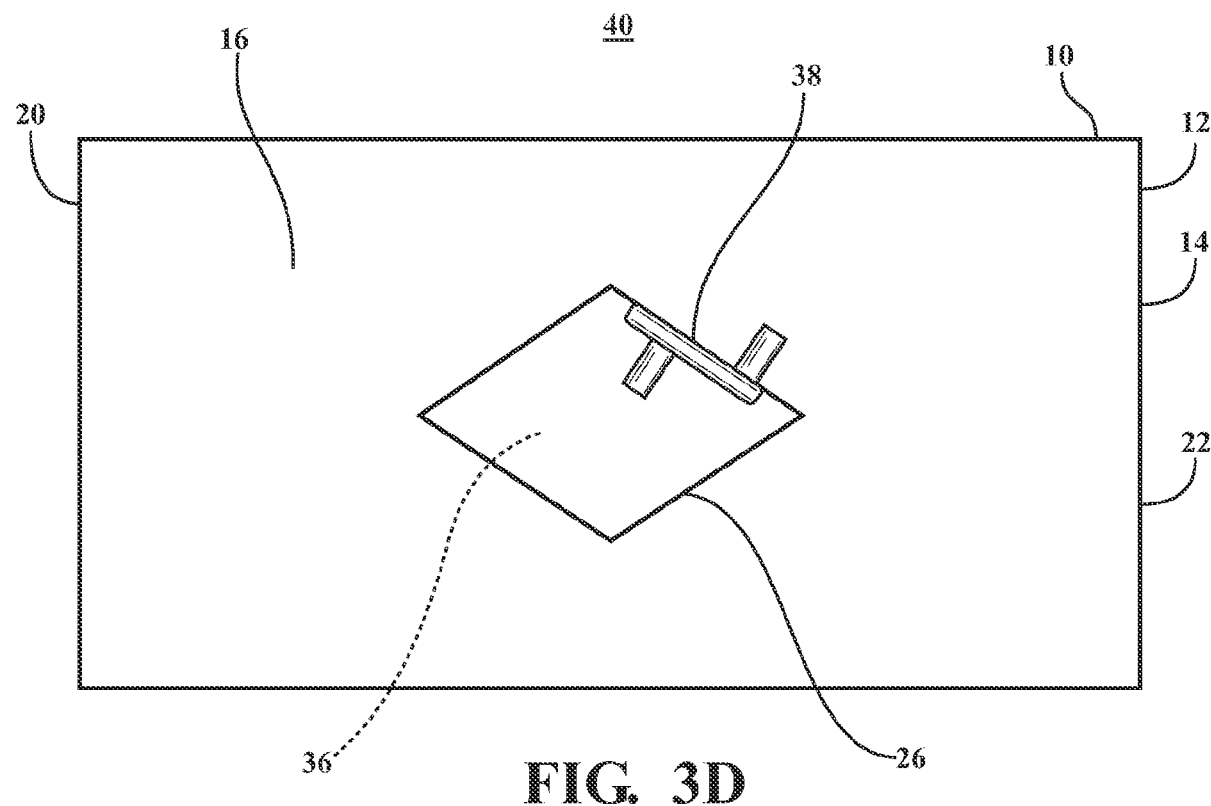
FIG. 3D is an example of a transfer pump configured to pump fluid between the hinge and an inflation chamber of the soft actuator.

With additional reference to FIG. 3D, the hinge 26 can be configured to cause the jamming surfaces 36 to be pressed together or to not be pressed together. Accordingly, the hinge 26 can include a transfer pump 38. The transfer pump 38 is operable to pump fluid into or out of the hinge 26. For example, as shown, the transfer pump 38 can be operated to pump fluid between the hinge 26 and the inflation chamber 12. In another example, the transfer pump 38 can be operated to pump fluid between the hinge 26 and an external environment 40 of the soft actuator 10. In either example, the transfer pump 38 can be configured to pump fluid into the hinge 26 in the inflation stage 30. This allows the jamming surfaces 36 to not be pressed together, which decreases the stiffness of the hinge 26. In the inflated stage 32, the transfer pump 38 can be configured to pump fluid out of the hinge 26 which presses the jamming surfaces 36 together to increase the stiffness of the hinge 26.

Figure 4A:
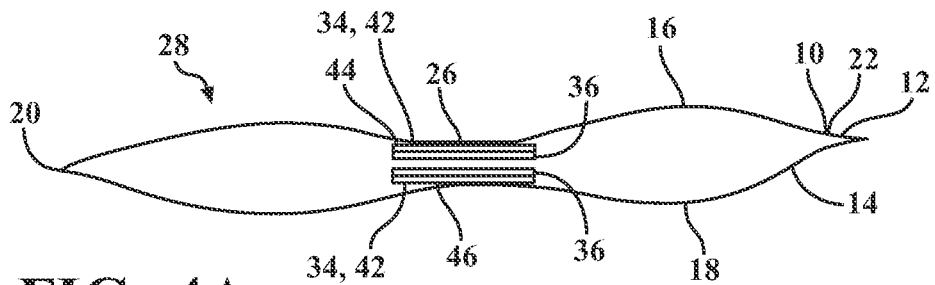
FIG. 4A is a cross-section of a third and fourth implementation of the soft actuator in the deflated stage.
Figure 4B:
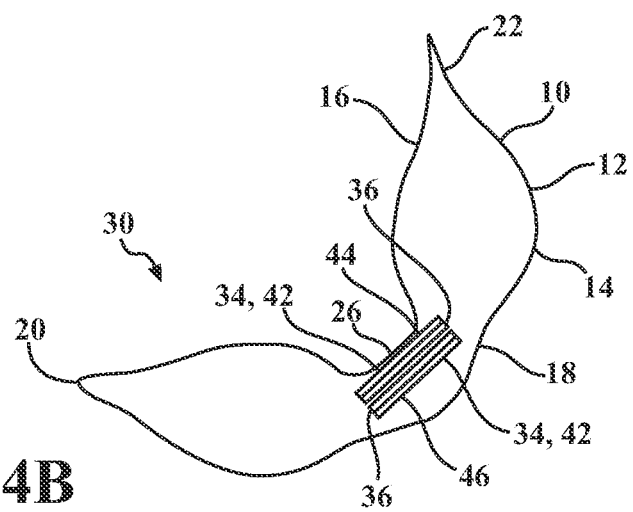
FIG. 4B is a cross-section of the third and fourth implementation of the soft actuator in the inflation stage.
Figure 4C:
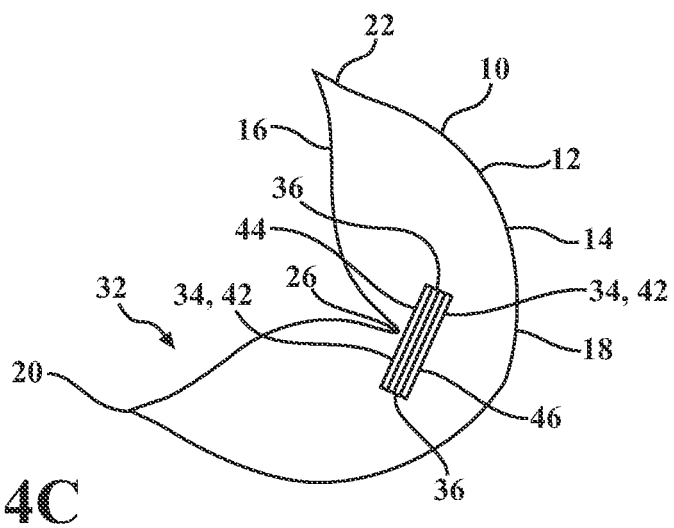
FIG. 4C is a cross-section of the third and fourth implementation of the soft actuator in the inflated stage.

Referring now to FIGS. 4A-4C, in a third implementation, the hinge 26 can include a combination of active material 34 and jamming surfaces 36. The active material 34 is configured to bring the first side 16 and the second side 18 together at the hinge 26 in order to press the jamming surfaces 36 together. The active material 34 can be located at the hinge 26 between the first side 16 and the second side 18 and can be connected to the inside of the first side 16 and the inside of the second side 18. The jamming surfaces 36 can be connected to the active material 34 and can be made of any suitable high-friction material. For example, the jamming surfaces 36 can be made from sandpaper. In this implementation, the active material 34 can be activatable and/or de-activatable to change size. For example, the size of the active material 34 can be increased when activated (e.g., when electrical energy is applied to the active material 34), and the size of the active material 34 can be decreased when de-activated (e.g., when electrical energy is removed from the active material 34). The active material 34 can be any suitable active material 34 configured to change size when activated or deactivated. For example, the active material 34 can be shape memory alloy (SMA) or shape memory polymer (SMP). When the active material 34 has a decreased size, the jamming surfaces 36 are separated from each other and slidable across each other. Accordingly, in the deflated stage 28 and the inflated stage 32, the active material 34 can be de-activatable such that the jamming surfaces 36 are slidable across each other and the hinge 26 has a decreased stiffness. When the active material 34 has an increased size, the jamming surfaces 36 are pressed together. Accordingly, in the inflated stage 32, the active material 34 can be activatable such that the jamming surfaces 36 are pressed together and the hinge 26 has an increased stiffness.

With further reference to FIGS. 4A-4C, in a fourth implementation, the hinge 26 can include an electrostatic clutch 42 as well as jamming surfaces 36. The electrostatic clutch 42 is configured to bring the first side 16 and the second side 18 together at the hinge 26 in order to press the jamming surfaces 36 together. The electrostatic clutch 42 can be created in any suitable way. For example, the electrostatic clutch 42 can be made from electroactive polymer (EAP). The electrostatic clutch 42 can include a first side 44 and a second side 46. The first side 44 and the second side 46 of the electrostatic clutch 42 can be respectively connected to the first side 16 and the second side 18 of the inflation chamber 12. For example, as shown, the first side 44 and the second side 46 of the electrostatic clutch 42 can be respectively connected to the inside of the first side 16 and the inside of the second side 18 of the inflation chamber 12. Alternatively, the first side 44 and the second side 46 of the electrostatic clutch 42 can be respectively connected to the outside of the first side 16 and the outside of the second side 18 of the inflation chamber 12. The jamming surfaces 36 can be connected to the inflation chamber 12 at the hinge 26. For example, as shown, the jamming surfaces 36 can be connected to the first side 44 and the second side 46 of the electrostatic clutch 42. Alternatively, if the electrostatic clutch 42 is connected to the outside of the inflation chamber 12, the jamming surfaces 36 can be connected to the inside of the first side 16 and the inside of the second side 18 of the inflation chamber 12. The jamming surfaces 36 can be connected to the active material 34 and can be made of any suitable high-friction material. For example, the jamming surfaces 36 can be made from sandpaper.

In the deflated stage 28 and the inflation stage 30, the electrostatic clutch 42 can be configured to be neutrally-charged. For example, there may be no voltage applied to the electrostatic clutch 42. This allows the jamming surfaces 36 to be slidable across each other to decrease the stiffness of the hinge 26. In the inflated stage 32, a positive voltage can be applied to one side of the electrostatic clutch 42 and a negative voltage can be applied to the opposite side of the electrostatic clutch 42. For example, a positive voltage can be applied to the first side 44 of the electrostatic clutch 42 and a negative voltage can be applied to the second side 46 of the electrostatic clutch 42. Or, a negative voltage can be applied to the first side 44 of the electrostatic clutch 42 and a positive voltage can be applied to the second side 46 of the electrostatic clutch 42. In either example, when a voltage differential is applied to the electrostatic clutch 42, the first side 44 and the second side 46 of the electrostatic clutch 42 are pulled together, thus pulling the first side 16 and the second side 18 of the inflation chamber 12 together. This presses the jamming surfaces 36 together and increases the stiffness of the hinge 26.

With reference now to FIG. 5, the soft actuator 10 can be part of an actuation system 48. The actuation system 48 can include a stimulation device 50. The stimulation device 50 can be electrically connected to the active material 34 or the electrostatic clutch 42. The stimulation device 50 is operable to generate and apply the requisite stimuli to the active material 34 or the electrostatic clutch 42. The stimulation device 50 can include an electrical energy generation device. As mentioned above, in the third and fourth implementations, the actuation system 48 can also include a transfer pump 38 operable to pump fluid into or out of the hinge 26.

The actuation system 48 can also include a computing device 52. The computing device 52 can be configured to operate one or more components of the actuation system 48. The computing device 52 is communicatively connected to the inflation pump, the transfer pump 38, and/or the stimulation device 50. The computing device 52 may include one or more processors communicatively coupled with a memory. The processor(s) may include any device capable of executing machine-readable instructions, which may be stored on a non-transitory computer-readable medium, for example, the memory. The processor(s) may include a controller, an integrated circuit, a microchip, a computer, and/or any other computing device 52. The memory may include any type of computer-readable medium suitable for storing data and algorithm. For example, the memory may include RAM, ROM, a flash memory, a hard drive, and/or any device capable of storing machine-readable instructions. Various algorithms and data for operating the actuation system 48 may reside in whole or in part in the memory.

The computing device 52 can be configured to identify a condition of the soft actuator 10. The condition can be a deflated condition, an inflation condition, or an inflated condition. The deflated condition indicates that the soft actuator 10 is in the deflated stage 28, and that the stiffness of the hinge 26 should be decreased or should otherwise remain decreased. The inflation condition indicates that the soft actuator 10 is in the inflation stage 30, and that the stiffness of the hinge 26 should be decreased or should otherwise remain decreased. The inflated stage 32 indicates that the soft actuator 10 is in the inflated stage 32, and that the stiffness of the hinge 26 should be increased or should otherwise remain increased. When the computing device 52 identifies the deflated condition or the inflation condition, it can be configured to operate the transfer pump 38 to pump fluid into the hinge 26, or it can be configured to deactivate the active material 34 or the electrostatic clutch 42 to decrease the stiffness of the hinge 26. When the computing device 52 identifies the inflated condition, it can be configured to operate the transfer pump 38 to pump fluid out of the hinge 26, or it can be configured to activate the active material 34 or the electrostatic clutch 42 to increase the stiffness of the hinge 26.

Now that the various potential systems, devices, elements, and/or components have been described, a method, including various possible steps of such method, will now be described. The method described may be applicable to the arrangements described above, but it is to be understood that the method can be carried out with other suitable systems and arrangements. Moreover, the method may include other steps not shown here, and the method is not limited to including every step shown. The blocks illustrated here as part of the method are not limited to the particular chronological order. Indeed, some of the blocks may be performed in a different order than what is shown and/or at least some of the blocks shown can occur simultaneously.

Figure 6:
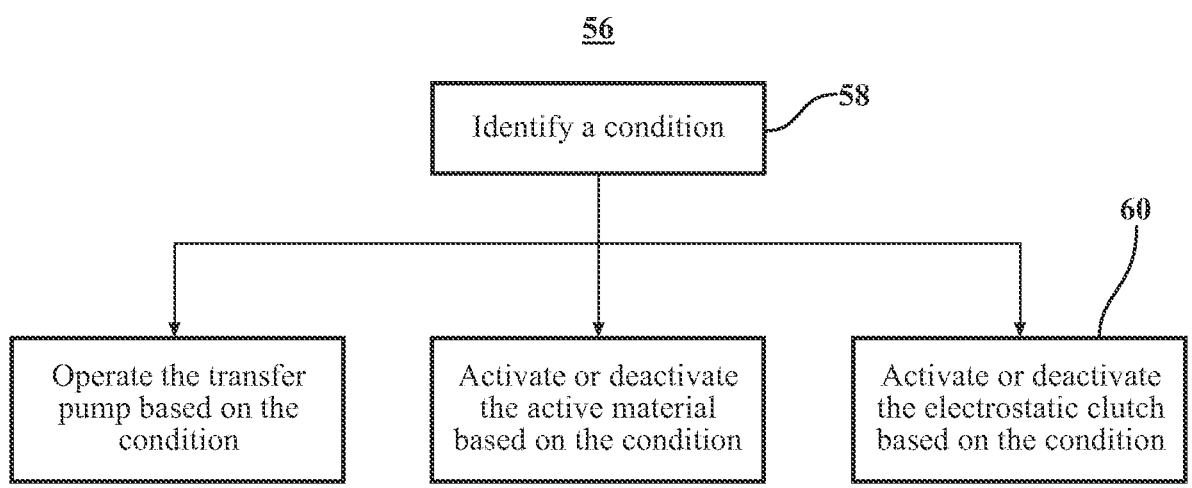
FIG. 6 is an example of a method for the actuation system.

Referring to FIG. 6, an example of a method 56 is shown. In operation 58, a condition can be identified. As described herein the condition can be a deflated condition, an inflation condition, or an inflated condition. The condition can be identified by the computing device 52. The method 56 can continue to operation 60. In operation 60, responsive to the identified condition, stiffness of the hinge 26 can be caused to be varied. For example, the transfer pump 38 can be operated based on the condition, the active material 34 can be activated or deactivated based on the condition, or the electrostatic clutch 42 can be activated or deactivated based on the condition.

Figure 7:
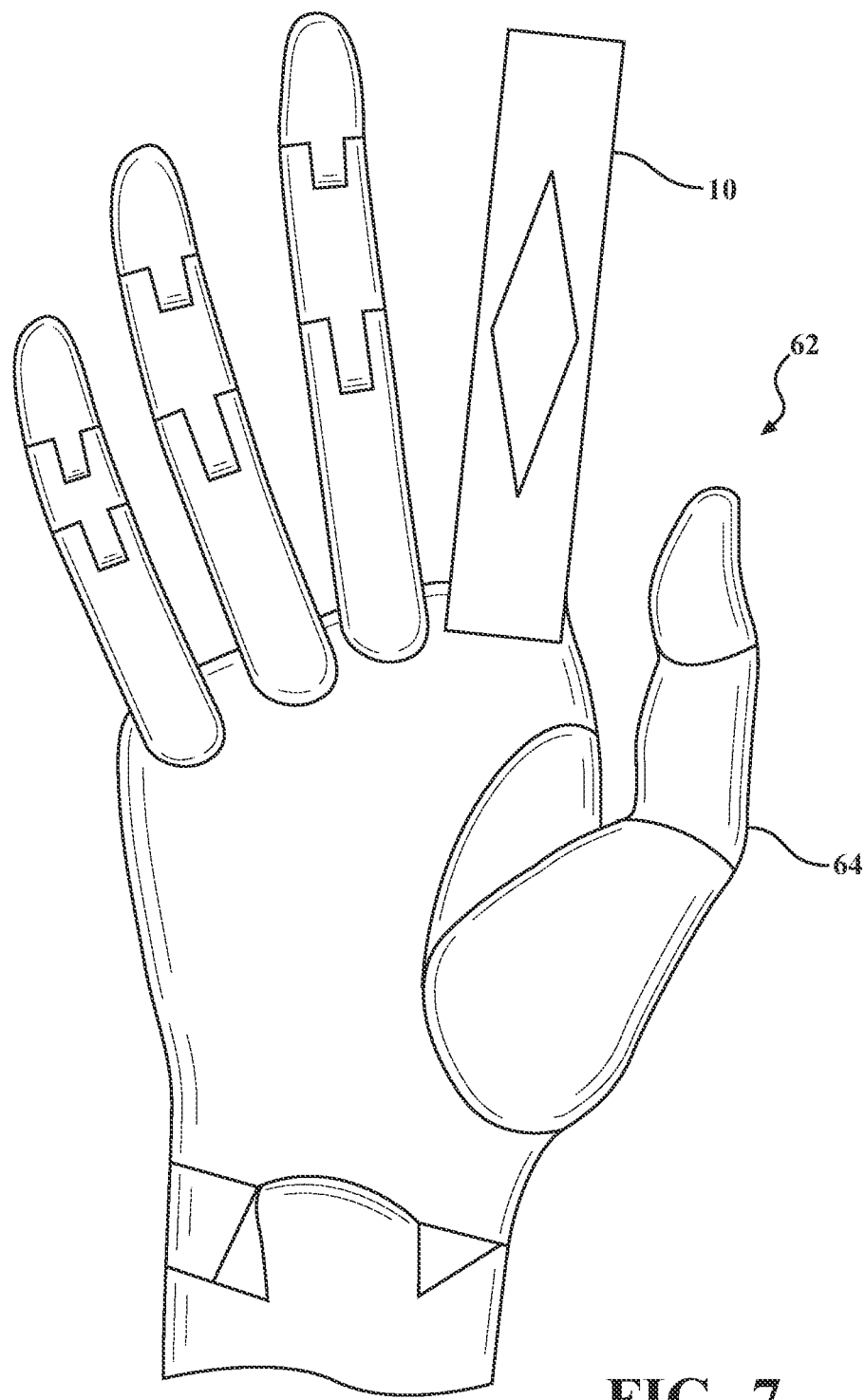
FIG. 7 is an example of an implementation of the soft actuator in a robotics system.

Referring now to FIG. 7, the actuation system 48 can be part of a larger system. For example, as shown, the actuation system 48 can be part of a robotics system 62. For example, the soft actuator 10 can be used in a robotic hand to re-create a human finger 64. When the soft actuator 10 is in the deflated stage 28 or the inflation stage 30, the soft actuator 10 re-creates the feeling of a bendable human finger. When the soft actuator 10 is in the inflated stage 32, the soft actuator 10 re-creates the feeling of a rigid human finger, which can be used to grip objects, press buttons, and perform other similar tasks.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A soft actuator, comprising:
an inflation chamber having a first end and a second end opposite the first end, and inflatable during an inflation stage, in which the second end rotates toward the first end about a folding axis, and loadable during an inflated stage; and
a variable-stiffness hinge integrally formed from a surface of the inflation chamber and located between the first end and the second end along the folding axis, wherein the hinge is configured to have a decreased stiffness in the inflation stage and an increased stiffness in the inflated stage.

2. The soft actuator of claim 1, wherein the inflation chamber has a higher deformability in the inflation stage and a lower deformability in the inflated stage.

3. The soft actuator of claim 1, wherein, when the hinge has a decreased stiffness, the hinge is soft and the soft actuator is able to inflate and deform under a load applied to the inflation chamber and wherein, when the hinge has an increased stiffness, the soft actuator is stiff and does not substantially deform under a load applied to the inflation chamber.

4. The soft actuator of claim 1, further comprising:
active material located at the hinge and configured to have a decreased stiffness when deactivated and an increased stiffness when activated, wherein the active material is de-activatable during the inflation stage to decrease the stiffness of the hinge, and wherein the active material is activatable during the inflated stage to increase the stiffness of the hinge.

5. The soft actuator of claim 4, wherein the hinge has a first side and a second side opposite the first side, and wherein the active material forms a portion of the first side and the second side.

6. The soft actuator of claim 4, wherein the hinge has a first side and a second side opposite the first side, and wherein the active material is connected to the inside of the first side and the inside of the second side.

7. A soft actuator, comprising:
an inflation chamber having a first end and a second end opposite the first end, and inflatable during an inflation stage, in which the second end rotates toward the first end about a folding axis, and loadable during an inflated stage;
a variable-stiffness hinge located between the first end and the second end along the folding axis, wherein the hinge is configured to have a decreased stiffness in the inflation stage and an increased stiffness in the inflated stage; and
two jamming surfaces located at the hinge, wherein the jamming surfaces are slidable across each other in the inflation stage to decrease the stiffness of the hinge, and wherein the jamming surfaces are pressable together in the inflated stage to increase the stiffness of the hinge.

8. The soft actuator of claim 7, wherein the jamming surfaces are jamming sheets of high-friction material.

9. The soft actuator of claim 7, further comprising:
a transfer pump operable to pump fluid into or out of the hinge, wherein the transfer pump is operable to pump fluid into the hinge during the inflation stage such that the jamming surfaces are slidable across each other to decrease the stiffness of the hinge, and wherein the transfer pump is operable to pump fluid out of the hinge during the inflated stage such that the jamming surfaces are pressed together to increase the stiffness of the hinge.

10. The soft actuator of claim 7, further comprising:
active material located at the hinge and configured to have a decreased size when deactivated and an increased size when activated, wherein the jamming surfaces are located between the active material, wherein the active material is de-activatable in the inflation stage to have a decreased size such that the jamming surfaces are slidable across each other to decrease the stiffness of the hinge, and wherein the active material is activatable in the inflated stage to have an increased size such that the jamming surfaces are pressed together to increase the stiffness of the hinge.

11. The soft actuator of claim 10, wherein the hinge has a first side and a second side opposite the first side, and wherein the active material forms a portion of the first side and the second side.

12. The soft actuator of claim 10, wherein the hinge has a first side and a second side opposite the first side, and wherein the active material is connected to the inside of the first side and the inside of the second side.

13. The soft actuator of claim 7, further comprising:
an electrostatic clutch located at the hinge, wherein the jamming surfaces are located between the electrostatic clutch, wherein the electrostatic clutch is de-activatable in the inflation stage such that the jamming surfaces are slidable across each other to decrease the stiffness of the hinge, and wherein the electrostatic clutch is activatable in the inflated stage to press the jamming surfaces together to increase the stiffness of the hinge.

14. An actuation system, comprising:
a soft actuator having an inflation chamber, the inflation chamber having a first end and a second end opposite the first end, and inflatable during an inflation stage, in which the second end rotates toward the first end about a folding axis, and loadable during an inflated stage, and the inflation chamber having a variable-stiffness hinge integrally formed from a surface of the inflation chamber and located between the first end and the second end along the folding axis, wherein the hinge has a decreased stiffness in the inflation stage and an increased stiffness in the inflated stage; and
a computing device including a processor communicatively coupled with a memory, the processor including machine-readable instructions stored in the memory that when executed, cause the processor to identify a condition of the soft actuator and cause the stiffness of the hinge to be increased or decreased based on the condition.

15. The actuation system of claim 14, wherein the condition is one of a deflated condition, an inflation condition, and an inflated condition.

16. The actuation system of claim 15, further comprising:
active material located at the hinge and configured to have a decreased stiffness when deactivated and an increased stiffness when activated, wherein, responsive to identifying the deflated condition or the inflation condition, the processor is configured to deactivate the active material to cause the stiffness of the hinge to be decreased, and wherein, responsive to identifying the inflated condition, the processor is configured to activate the active material to cause the stiffness of the hinge to be increased.

17. The actuation system of claim 15, further comprising:
two jamming surfaces located at the hinge, wherein the jamming surfaces are slidable across each other in the inflation stage to decrease the stiffness of the hinge, and wherein the jamming surfaces are pressable together in the inflated stage to increase the stiffness of the hinge.

18. The soft actuator of claim 17, wherein the jamming surfaces are jamming sheets of high-friction material.

19. The soft actuator of claim 17, further comprising:
active material located at the hinge and configured to have a decreased size when deactivated and an increased size when activated, wherein the jamming surfaces are located between the active material, wherein, responsive to identifying the deflation condition or the inflation condition, the processor is configured to deactivate the active material to have a decreased size such that the jamming surfaces are slidable across each other to decrease the stiffness of the hinge, and wherein, responsive to identifying the inflated condition, the processor is configured to activate the active material to have an increased size such that the jamming surfaces are pressed together to increase the stiffness of the hinge.

20. The soft actuator of claim 17, further comprising:
an electrostatic clutch located at the hinge, wherein the jamming surfaces are located between the electrostatic clutch, wherein, responsive to identifying the deflation condition or the inflation condition, the processor is configured to deactivate the electrostatic clutch such that the jamming surfaces are slidable across each other to decrease the stiffness of the hinge, and wherein, responsive to identifying the inflated condition, the processor is configured to activate the electrostatic clutch to press the jamming surfaces together to increase the stiffness of the hinge.

* * * * *